June 4, 1940.  P. J. COSTELLO  2,203,130
BEER ENERGIZER
Filed Dec. 16, 1938
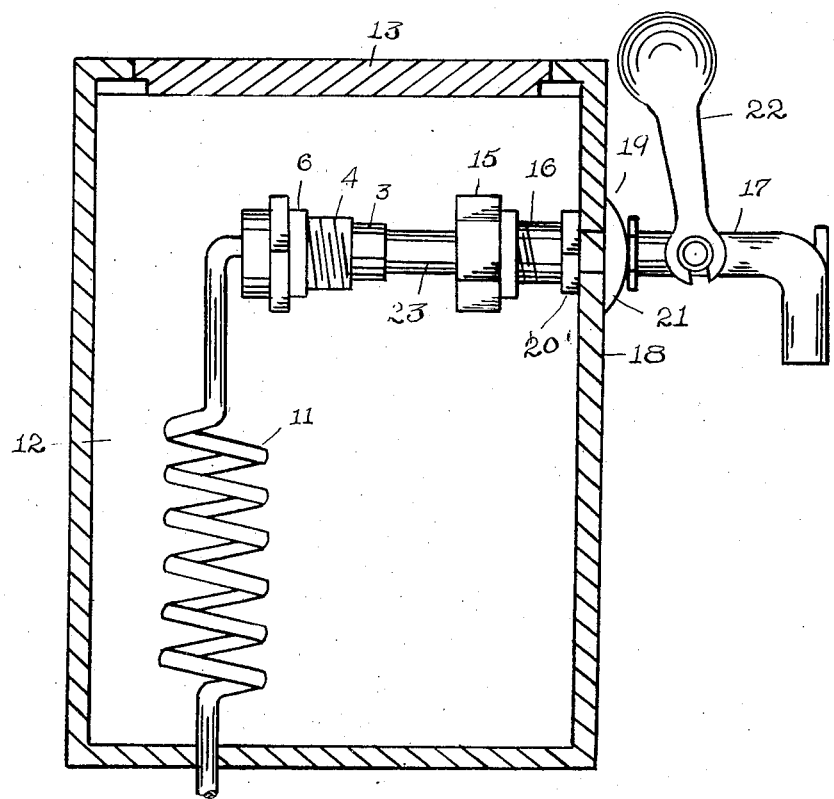
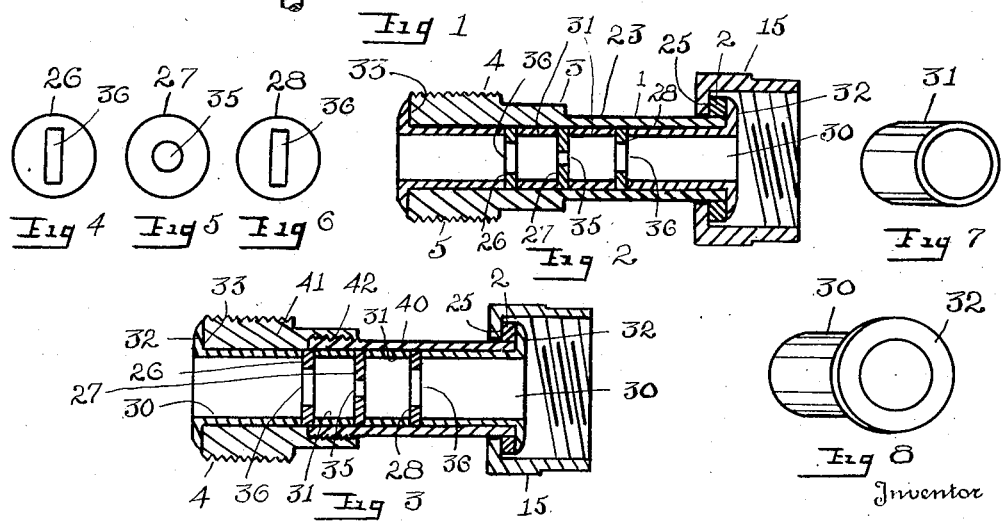
Inventor
Patrick J. Costello
By Thomas L. Wilder
Attorney Patented June 4, 1940

2,203,130

UNITED STATES PATENT OFFICE 2,203,130

BEER ENERGIZER

Patrick J. Costello, Utica, N. Y.

Application December 16, 1938, Serial No. 246,163

2 Claims. (Cl. 259—4)

My invention relates to a beer energizer and I declare the following to be a full, clear, concise and exact description thereof sufficient to enable anyone skilled in the art to which it appertains to make and use the same, reference being had to the accompanying drawing in which like reference characters refer to like parts throughout the specification.

The object of my invention is to provide a device for drawing beer in its normal stage without applying extra pressure or force, whereby to create a fine creamy foam.

In the normal drawing of beer the energizer herein disclosed creates a creamy beer by passing the beer through a conduit having disposed therein baffle discs arranged in certain positions in the conduit, whereby to effect a creamy beer.

The object will be understood by referring to the drawing in which

Fig. 1 is an elevational view showing the device applied to an ice chest illustrated in section.

Fig. 2 is a detail enlarged view showing a central section of the energizer.

Fig. 3 is an enlarged view showing a central section of the modified form of the energizer.

Fig. 4 is a detail enlarged view showing a disc employed.

Fig. 5 is a detail enlarged view showing a disc employed.

Fig. 6 is a detail enlarged view showing a disc employed.

Fig. 7 is a detail enlarged view showing a spacing sleeve employed.

Fig. 8 is a detail enlarged view showing another spacing sleeve employed.

Referring more particularly to the drawing the device embodies an outer tubular member 1 having an annular flange 2 that is brazed or otherwise firmly fixed thereto. Member 1 is enlarged in diameter at 3 and again at 4. Enlarged part 4 has threads 5 formed externally thereto upon which is mounted a union coupling 6 that is screw threaded at 5 thereto.

Coupling 6 joins member 1 to the end of coil 11 that is disposed in an ice chest 12 having a removable cover 13. Another coupling 15 is mounted to the opposite end of member 1, whereby to join it to the threaded end 16 of spigot 17. Spigot 17 is mounted to casing 18 of chest 12 near its upper end as at 19. It projects through casing 18 and is held on the inside by a nut 20 screw threaded to spigot 17. A flange 21 on spigot 17 abuts against the outer surface of casing 18 to cooperate with nut 20, whereby to hold spigot 17 rigidly in place. Spigot 17 has a faucet or handle 22.

Coupling 15 has a sliding fit on the reduced portion 23 of member 1 and forms a hermetical joint therewith. Shoulder 25 formed thereon prevents said member 1 from passing by flange 2 after flange 2 is assembled to member 1.

Baffle discs 26, 27 and 28 are disposed within tubular member 1 and are held in place relative near each other by flanged spacing sleeves 30, 30 and 31, 31, which fit within tubular member 1. Each of the sleeves 30, 30 has a flange 32 that is welded, brazed, soldered or otherwise secured against the adjacent surfaces of flange 2 and end 33 of member 1 respectively. Spacing sleeves 31, 31 are disposed between sleeves 30, 30 and between baffle discs 26, 27 and 28.

The center baffle plate 27 has a round hole or aperture 35 in the center portion for the passage of the beer, whereas each of the other two baffles 26 and 28 have a narrow rectangular slot 36. Said baffles 26, 27 and 28 are disposed in alignment with each other and likewise aperture 35 and slots 36 are in alignment.

In order to assemble the parts of the energizer, coupling 15 is slipped onto the reduced portion 3 of member 1, flange 2 applied and welded in place. One of the flange spacing sleeves 30 is slipped into the end of member 1 and its flange brazed or welded to the end of member 1. Baffle disc 26 is dropped through the opposite end of member 1 in place against disc 26. Following this there is dropped in place from the same end of member 1 one of the spacing sleeves 31 and then disc 27, sleeve 31 and finally disc 28. The flange of the other spacing sleeve 30 is welded, brazed or soldered to the contiguous surface of flange 2 of member 1.

Assuming that the user has turned the faucet handle 22 to open position, the beer will flow through the energizer. As it passes through the rectangular slot 36 of the first disc 26 it will be impeded and caused to flow therethrough in a rectangular shaped stream. When it reaches disc 27 it will be again impeded and caused to pass through round hole 35 in a cylindrical stream. Again at disc 28 it will be impeded and caused to pass through rectangular slot 36 therein in a rectangular shaped stream. By means of these baffle discs 26, 27 and 28 the natural flow of the beer is broken up whereby it comes out of the spigot in a rich, fine cream foam.

A modification is shown in Fig. 3 which shows member 1 made in two parts 40 and 41 which are threaded to each other at 42. In all other respects the parts are the same as in the former structure.

Having thus described my invention what I claim as new and desire to secure by Letters Patent is as follows:

1. In a beer energizer, a tubular member having a central passage therethrough, and a flange at one end and an enlarged part at the other, discs disposed within said tubular member, spacing sleeves for holding certain of said discs in predetermined position and other spacing sleeves having flanges formed therein and abutting said flange and said enlarged part, whereby to aid in holding said disc in predetermined position, one of said discs having round apertures formed therein and other discs having rectangular apertures formed therein, whereby said disc will form an irregular passageway to create a fine, creamy foam of the beer passing therethrough.

2. In a beer energizer, a tubular member having an enlarged part with external threads formed thereon at one end and a flange at the other, a coupling mounted on said member, discs mounted within said first named member, cylindrical spacing sleeves to aid in holding said discs in predetermined relation and other spacing sleeve having flanges thereon abutting the enlarged part and the flange on said tubular member to also aid in holding said disc in predetermined relation, one of said discs having round apertures formed therein, other discs having rectangular apertures formed therein and said disc having the round apertures disposed between the discs having the rectangular apertures to form an irregular passageway, whereby to create a fine creamy foam of the beer passing therethrough.

PATRICK J. COSTELLO.